United States Patent [19]
Eggert

[11] 3,841,468
[45] Oct. 15, 1974

[54] MOLDED PLASTIC CONTAINER SECONDARY OPERATIONS MACHINE

[75] Inventor: Noel B. Eggert, Toledo, Ohio
[73] Assignee: Owens-Illinois Inc., Toledo, Ohio
[22] Filed: Nov. 28, 1972
[21] Appl. No.: 310,010

Related U.S. Application Data
[62] Division of Ser. No. 93,069, Nov. 25, 1970. U.S. Patent No. 3,716,910

[52] U.S. Cl.................... 198/221, 198/218, 74/44, 74/582
[51] Int. Cl............................................ B65g 25/08
[58] Field of Search ............ 198/218, 219, 221, 19; 214/1 BB; 74/44, 581, 582

[56] References Cited
UNITED STATES PATENTS
2,821,091  1/1958  Benner................................. 74/582
3,292,799  12/1966  Eggleston et al. .................. 198/219
3,661,247  5/1972  Wallis................................ 198/218
3,704,775  12/1972  Eickenhorst......................... 198/218

*Primary Examiner*—Evon C. Blunk
*Assistant Examiner*—Joseph E. Valenza
*Attorney, Agent, or Firm*—Philip M. Rice; E. J. Holler

[57] ABSTRACT

Apparatus is provided for transferring articles from station to station in order that work operations can be performed on the articles at the various stations. The apparatus includes article grasping members which are mounted for lateral movement between open and closed positions and for reciprocal longitudinal movement. A rotary member interconnected with means upon which the article grasping members are mounted effects both the lateral and longitudinal movement by virtue of various connecting members including a contractible-extensible tie assembly.

5 Claims, 9 Drawing Figures

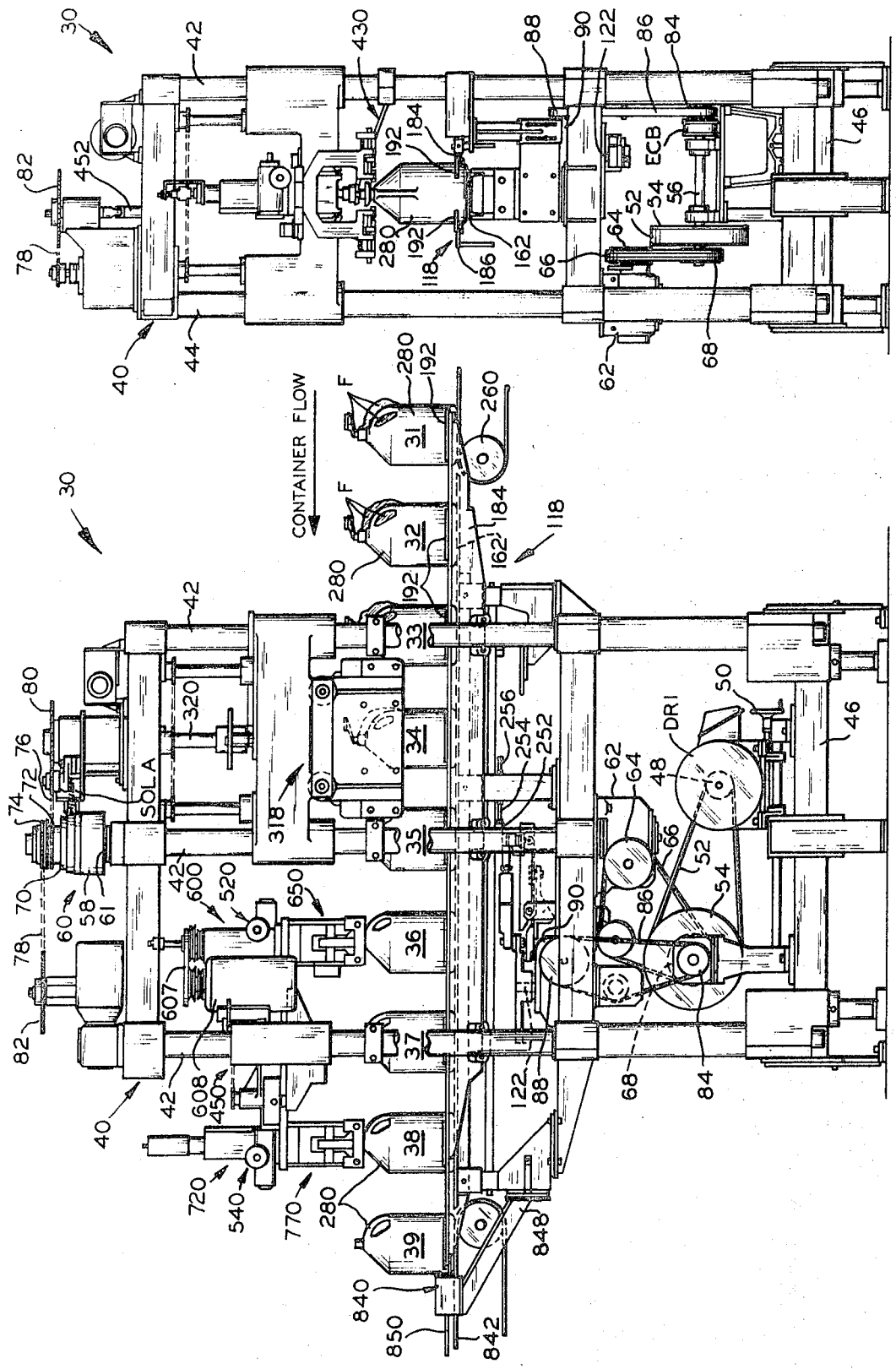

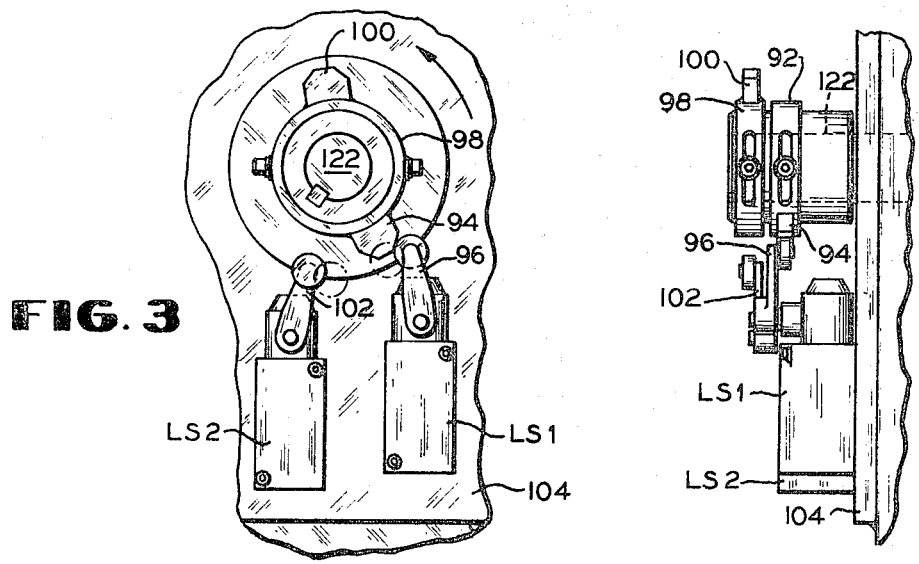
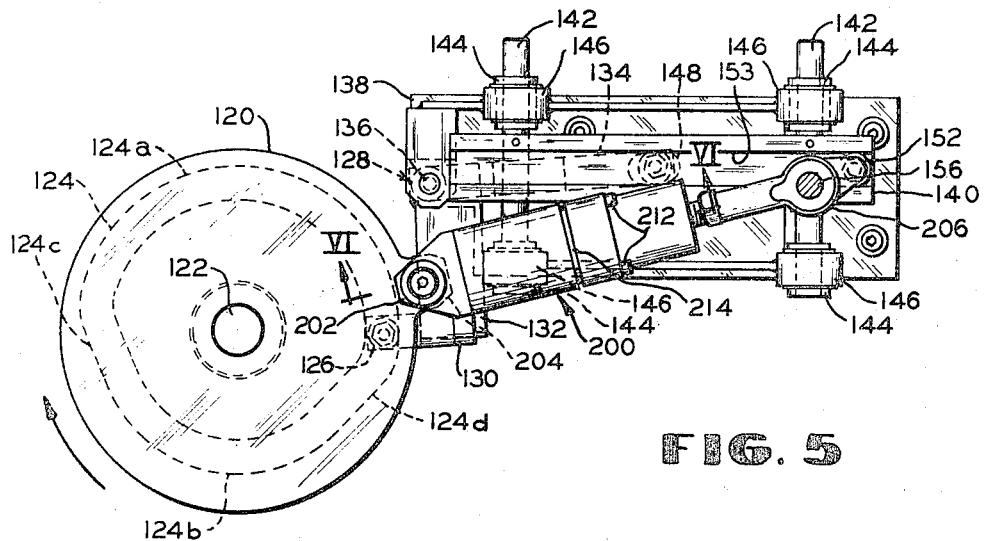
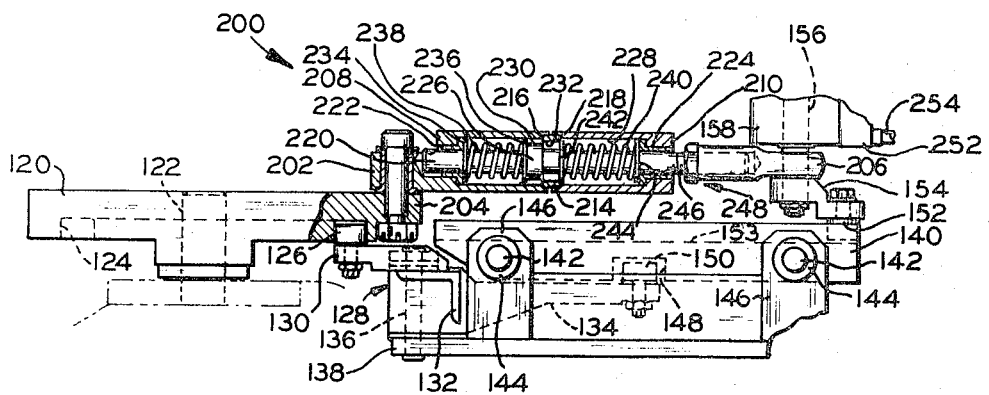

MOLDED PLASTIC CONTAINER SECONDARY OPERATIONS MACHINE

CROSS REFERENCE TO RELATED APPLICATION

This is a division of application Ser. No. 93,069, filed Nov. 25, 1970, now U.S. Pat. No. 3,716,910.

BACKGROUND OF THE INVENTION

The transfer device of the present invention was developed for use in a machine for performing secondary operations on molded plastic bottles, particularly ones having integrally molded handles. Thus, at one station the machine acts to trim the flash or waste portion from the handle area of a bottle, at another station it acts to face the top finish of the bottle to a precise configuration, while at a third station it acts to leak test the bottle. The transfer device of the present invention provides a simple yet reliable apparatus for effecting transfer of the bottles from station to station while insuring that the bottles are precisely positioned at the respective stations.

Accordingly, it is an object of this invention to provide an improved transfer mechanism for moving or indexing containers or other objects between stations.

Other objects or features of this invention will become apparent when the following description is taken in conjunction with the accompanying drawings:

FIG. 1 is a side elevational view of apparatus embodying the teachings of this invention taken from the left side of container flow from the loading station through the apparatus;

FIG. 2 is an end elevational view taken from the downstream side of the apparatus illustrated in FIG. 1;

FIG. 3 is a bottom view of means for determining the index position of the transfer mechanism;

FIG. 4 is a side elevational view of the apparatus illustrated in FIG. 3;

FIG. 5 is plan view of the index control portion of the transfer mechanism;

FIG. 6 is a side elevational view of the apparatus illustrated in FIG. 5, partially in section taken along lines VI—VI in FIG. 5;

Figure 7:
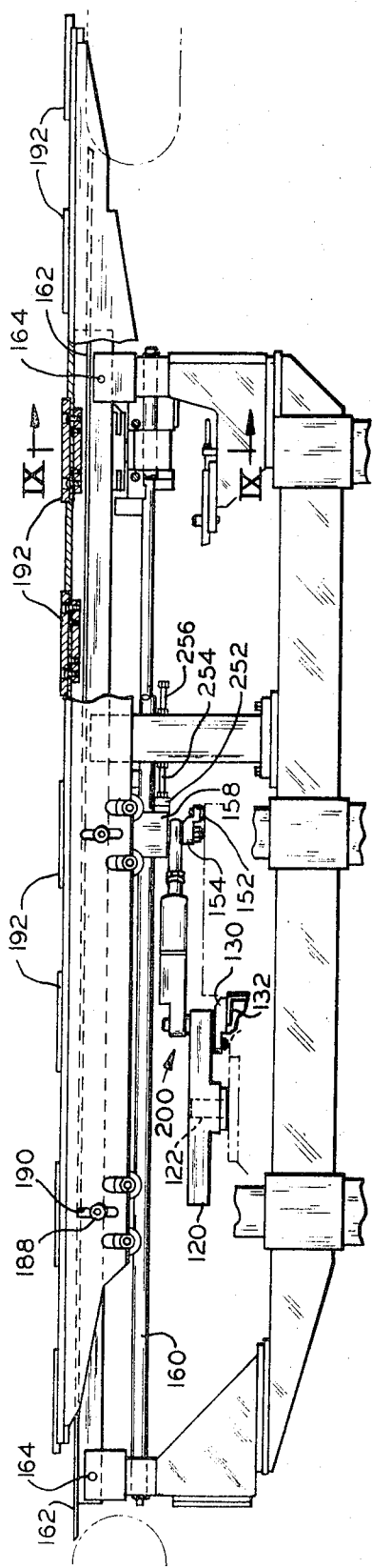
FIG. 7 is a side elevational view of the transfer mechanism emphasizing the clamp rails and apparatus for moving same.

Referring to the drawings, there is illustrated in FIG. 1 a side elevational view taken from the left of the center line of container flow through the apparatus and in FIG. 2 an end elevational view taken from a downstream side of FIG. 1, a general assembly layout of a machine 30 incorporating the teachings of this invention.

The machine 30 is designed to accept blown plastic containers 280 and perform secondary operations of deflashing, facing or other machining work, dimensional checking, and leak detection. The containers 280 are then deposited on an unloading conveyor or other removal means. Containers not within the dimensional or leak detection tolerances are ejected from the unloading conveyor and the remaining containers are conveyed to packing, filling, or other container use areas.

To perform these operations the machine 30 includes nine in-line stations which are noted in FIG. 1 as load station 31, orientation station 32, idle station 33, deflash station 34, idle station 35, facing or other machining station 36, idle station 37, leak detection and dimensional checking station 38, and unload station 39.

Containers 280 are delivered to load station 31 by an endless belt conveyor 260. An escapement mechanism blocks free entry of containers 280 into the load station causing the containers to accumulate in a column on conveyor 260. The escapement mechanism releases one container at a time to the load station in synchronization with the operation of an in-line transfer mechanism designated generally at 118 which moves or indexes individual containers from station to station. A container detection unit monitors the presence or absence of containers available at the load station and generates a signal in response to the lack of containers which may be utilized to shut down completely or temporarily halt the operation of the entire machine until one or more containers are again available at the load station.

General Assembly

The machine 30 includes a frame designated generally at 40 which includes three vertical posts 42 on the left and three vertical posts 44 on the right of the flow of the containers rigidly held in their assembled position by crossbraces or other rigid framework. Various parts of the frame 40 have been omitted or shown only as a portion or section in these and the remaining figures since the framework may take any suitable form and, unless discussed specifically, does not by itself form part of the invention.

A transfer mechanism indicated generally at 118 includes a fixed, smooth conveyor bed 162 extending from adjacent the loading conveyor 260 along the stream of flow of the containers beneath the intermediate operation and idle stations 32 to 38 and between the left and right sets of posts 42, 44 to a position adjacent the unloading conveyor 842. The fixed conveyor bed 162 is attached by suitable means to portions of the frame as described hereinafter, and supports the bottom of the containers while at the stations 32 to 38 and while the containers are being indexed from station to station.

The transfer mechanism also includes left and right clamp rails 184, 186 which carry opposed pairs of container clamps 192 which grip and move the containers from station to station in response to the actions of transferring and indexing apparatus which will be described in detail later.

A main drive motor DR1 is mounted on a subframe assembly 46 and drives a variable diameter pulley 48. The effective diameter of the pulley 48 may be changed by rotation of wheel crank 50 through a diameter changing mechanism known in the art. Thus the motor DR1 and the pulley 48 constitute a variable speed drive assembly for changing the speed of operation of the mechanisms driven by motor DR1.

A belt 52 is connected between pulley 48 and a pulley 54 secured on a drive distribution shaft 56 journally mounted on sub-frame 46. The distribution drive shaft 56 transmits rotational drive to a constantly rotating portion 58 of a one revolution clutch assembly 60 on top of the frame 40 via a shaft 62 extending down from clutch unit 60 through the middle right frame post 44 to a gear box 62 below post 44. A pulley 64 and belt 66 connect the gear box 62 to the pulley 68 on the distribution drive shaft 56.

An upper portion 70 of clutch unit 60 may be engaged by the energization of solenoid SOLA to turn shaft 320 of the deflasher station assembly 318 and shaft 452 of the facer and leak detector carrier assembly one revolution each. The single revolution is imparted by clutch unit 60 to shafts 320 and 452 via sprockets 72, 74 on the unit 60 connected by chains 76, 78 to sprockets 80, 82 driving shafts 320, 452, respectively.

The distribution drive shaft 56 may be connected through an electric clutch-brake unit ECB to drive a pulley 84. A belt 86 is connected between pulley 84 and a pulley 88 on a gear box 90 to rotate a shaft 122 which extends vertically above and below the gear box 90. The upper end of the shaft 122 carries a face cam control disc 120 which controls the action of the transfer mechanism. The lower end of the shaft 122 carries cams for actuating limit switches to indicate the index position of the transfer mechanism.

Referring to FIGS. 3 and 4 there is illustrated an index position cam-switch assembly which includes a first cam 92 fixedly secured to shaft 122 and having a cam surface 94 projecting therefrom to engage a cam follower assembly 96 once each revolution of the shaft 122 and actuate a limit switch LS1 mounted on a plate 104 attached to the frame. The cam surface projection 94 is positioned with respect to the location of the control disc 120 on the other end of the shaft 122 so that when the transfer mechanism is at the end of an index back or rear stroke the cam surface 94 engages cam follower 96 to open a first set of limit switch contacts LS1 and close a second set of limit switch contacts LS1. Since there is a dwell period between an index back and an index forward stroke, as will be explained hereinafter, the cam surface 94 continues rotation during the dwell period. At the end of the dwell period and before the index forward stroke begins, the cam surface 94 will rotate past the cam follower 96 and permit the cam follower to return to its original position, as shown in dashed lines. When the cam follower 96 returns to its original position, the first set of LS1 contacts will close and the second set of LS1 contacts will open.

Similarly, a cam surface 100 of a cam 98 is secured on the shaft 122 in a fixed position with respect to the control disc 122 so that a cam follower assembly 102 will actuate a first set of limit switch contacts LS2 closed and a second set of LS2 contacts open at the end of an index forward stroke. As the dwell period expires the cam surface 100 will rotate past the cam follower 102 to permit the first set of limit switch contacts LS2 to open and the second set of LS2 contacts to close.

The function of the sets of limit switch contacts LS1, LS2 will be explained hereinafter in the description of the electrical control circuit for the apparatus.

Transfer Mechanism

Referring to FIGS. 5 through 9, and particularly FIGS. 5 and 6 it can be seen that transfer mechanism includes the following.

A face cam control disc 120 is key mounted on drive shaft 122 extending upwardly from the gear box 90 described hereinbefore. The disc 120 has a cam track or groove 124 formed in the underface thereof and receives therein a cam roller 126. A cam follower designated generally at 128 is a three arm bell crank system having a first arm 130 rotatably supporting the cam roller 126, a second arm 132 and a third arm 134. A pivot pin 136 at the junction of the second and third arms 132, 134 pivotally supports the bell crank or cam follower 128 on a frame portion 138.

A cam rail 140 is mounted by set screws or the like on a pair of spaced shafts 142 which are supported for transverse sliding movement in spaced pairs of bushings 144 carried by frame portions 146. A cam slot 148 is formed in the underside of the cam rail 140 and receives a cam roller 150 which is rotatably carried on the end of arm 134 of the bell crank 128.

A second cam roller 152 is associated with the cam rail 140 and is received in a linear cam slot 153 formed along the length of and in the upper side of the cam rail 140. The cam roller 152 is rotatably suspended from an arm 154 which is key mounted on a shaft 156 vertically and pivotally supported in a centrally located indexing member 158 (best seen in FIG. 7). The indexing member 158 is slidably mounted on a pair of spaced index shafts 160 running the length of the transfer mechanism below the fixed conveyor bed 162. The fixed conveyor bed 162 preferably is formed with a smooth, long-wearing, metallic upper surface which offers little resistance to the sliding of the plastic bottles or containers along its length in response to the indexing of the bottles from station to station. The bed 162 may be secured to the frame by bolts 164 on each side and at the ends thereof.

A rocker arm 166 (best seen in FIG. 8) is key mounted at the midpoint thereof on the shaft 156 above the indexing member 158 and is positioned on the shaft 156 to extend along the line of travel of the bottles through the machine when opposing bottle clamps 192 are closed. A left clamp rail control arm 168 is pivotally connected between one end of the rocker arm 166 and a left clamp rail support 170. A right clamp rail control arm 172 is pivotally connected between the other end of the rocker arm 166 and a right clamp rail support 174. The left and right clamp rail supports 170, 174 are slidably mounted on a pair of spaced shafts 176 extending transversely beneath the conveyor bed 162. The shafts 176 are supported in spaced relationship in an indexing rail means 178 attached to the indexing support member 158.

Figure 8:
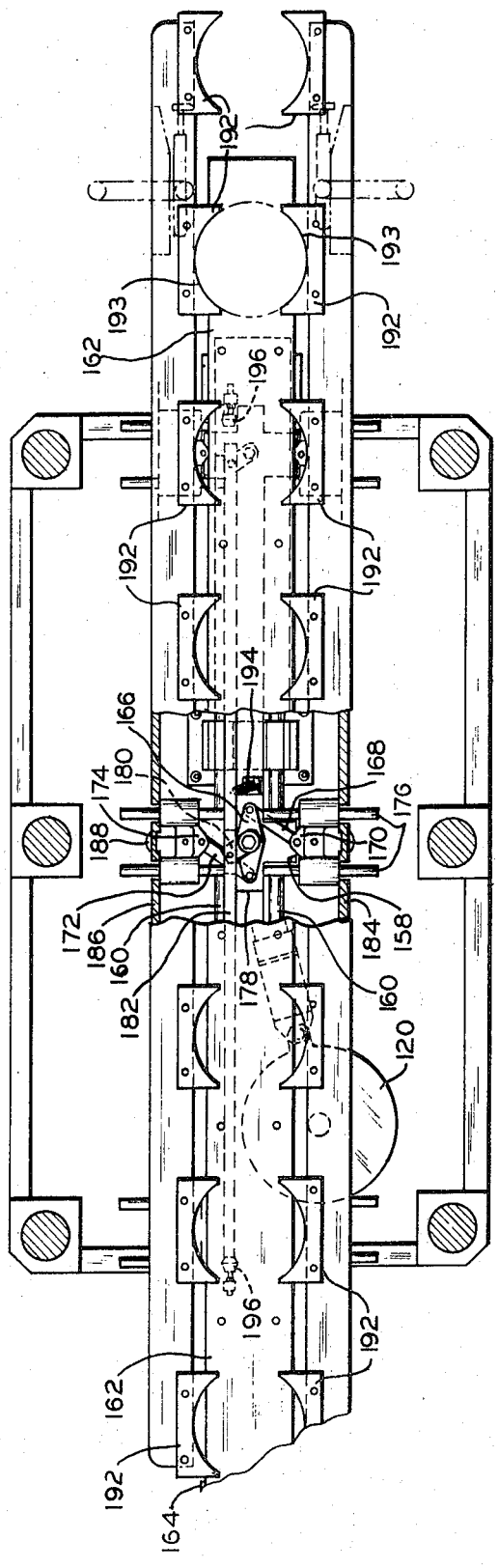
FIG. 8 is a plan view, partially in section, of the apparatus illustrated in FIG. 7.

A synchronizing arm 180 is key mounted on the shaft 156 above the rocker arm 166 and extends obliquely and forwardly with respect to the line of travel of the bottles and has its forwardly extending end connected to a clamp synchronizing rod or arm 182 extending to similar clamp "open" and "close" stations forward of and to the rear of the central station shown in FIG. 8.

A left clamp rail 184 and a right clamp rail 186 may be secured to the left and right clamp rail supports 170, 174 by bolts 188 extending through vertical adjustment slots 190 formed in the downwardly extending sides of the clamp rails. A plurality of opposing pairs of bottle clamps 192 are mounted on top of the clamp rails 184, 186 and extend toward each other to engage the bottles to be indexed.

In the bottle clamp "open" and "close" operation, the face cam control disc 120 rotates in a clockwise direction. The cam roller 126 is displaced inwardly torward the center of the disc 120 from the position shown in the plan view of FIG. 5 from the arcuate track portion 124a with the larger radius to an arcuate track portion 124b with a smaller radius, through a connecting or intermediate track portion 124c. This displacement of the cam roller 126 moves the arm 130 of the bell crank 128 toward the center of the disc 120, causing the end of arm 134 and the cam roller 150 to move to bear against the left side of slot 148 to move the cam rail 140 from a position to the right of the center line of the flow of bottles as shown in FIG. 5 to a corresponding position on the left of the center line.

Similarly, as the cam roller 126 reaches the end of the arcuate portion 124b of the track 124 it is displaced outwardly from the center of the disc 120 via a connecting track portion 124d back to the arcuate track portion 124a. The outward displacement of the cam roller 126 now acts in a reverse manner through the bell crank 128 to move the cam rail 140 transversely from the left position to its original position to the right of the center line of the flow of bottles.

Since the track portions 124a and 124b each have a constant radius throughout their length there is no displacement of the cam roller 126 while those portions of the track are traveling past the roller 126 and thus there is no movement of the cam rail 140.

When the cam track or slot 153 and the cam rail 140 is shifted from the position to the right of the line of travel of the bottles shown in FIG. 5 to a corresponding position to the left of the line of travel, the cam roller 152 is acted on by the right side of the cam slot 153 in the upper side of rail 140. This action rotates the shaft 156 and thus also rotates the rocker arm 166 and the synchronizing rod 180 in a clockwise direction about the axis of the shaft 156.

The rotation of the rocker arm 166 about its midpoint moves the ends thereof in a clockwise direction to apply force through the left and right clamp rail control arms 168, 172 to move the left and right clamp rail supports 170, 174 transversely and outwardly on the shafts 176. The left and right clamp rails 184, 186 carried on the supports 170, 174 thus also move outwardly and separate the clamps 192 carried thereon.

The opposing pairs of bottle clamps 192 are secured to the upper side of the clamp rails 184, 186 and extend toward each other. The opposing inner faces of the bottle clamps 192 have recesses 193 formed therein that will accommodate and substantially mate with the external configuration of the bottle being held or grasped. In this instance, since that portion of the bottle being grasped is cylindrical, the inner faces or recesses 193 at least partially define an arc of a circle having a diameter substantially the same as the outside diameter of the bottle.

The opposing pairs of clamps 192 are spaced apart along the length of the clamp rails 184, 186 a distance equal to the distance between each operation station and/or idle station of the machine along the length of the conveyor bed 162. The outward transverse movement of the supports 170, 174 and rails 184, 186 opens all pairs of clamps, leaves each bottle at the desired station and permits the clamp rails 184, 186 to be indexed back.

Movement of the cam slot 153 in the cam rail 140 from the left side of the center line of travel back to the right side thereof will reverse the operation just described and will close the clamps 192. This cam rail movement does not occur, however, until the index mechanism has moved the clamp rails 184, 186 and the opposed pairs of open clamps 192 back one station so that each succeeding bottle may be grasped for indexing forward one station.

Figure 9:
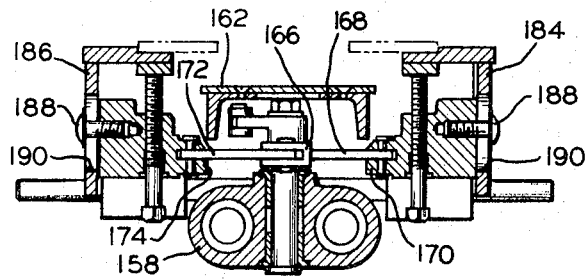
FIG. 9 is a sectional view of the apparatus illustrated in FIG. 7 along lines IX—IX of FIG. 7.

The clamp opening and closing operation just described for the centrally located clamp operation mechanism may be translated through the synchronizing arm 180 and the rod 182 to one or more similar clamp operating mechanisms located to the rear of or forward of the central mechanism. It is to be understood that other synchronizing arms similar to the arm 180 are pivotally connected to the rod 182 at one end thereof and key mounted on a shaft similar to the shaft 156 which carries a similar rocker arm connected to similar left and right clamp control arms for moving similar left and right clamp rail supports which may be secured to the left and right clamp rails 184, 186, respectively as shown in FIG. 9.

Springs 194 may be connected between a support on the indexing rail means 178 and the rod 182 to bias the clamp synchronizing rod 182 and thus the clamp rails 184, 186 and the clamps 192 to the clamp closed or clamp opened position once the midpoint of travel of the ram 180 is reached. The springs 194 thus provide a positive, snap action to the opening and closing of the bottle clamps 192.

Stop spindles 196 may be secured to the frame at each end of the rod 182 to provide positive stop points and positioning for the reciprocal travel of the rod 182.

Referring now to the mechanism for indexing the clamp rails on forward and return strokes there is best shown in FIGS. 5 and 6 a tie rod assembly 200 having a first end 202 pivotally connected to projection 204 extending from the circumference of the index control disc 120, and a second end 206 pivotally connected to the shaft 156. The tie rod assembly 200 includes a two-piece housing indicated at 208 and 210, the members 208, 210 being connected by bolts 212. An annular spacing and aligning member 214 is received by counter bores 216 and 218 formed in the facing ends of housing members 208, 210.

A shaft 220 is slidably mounted in bearings 222, and 224 seated at opposite ends of housing members 208, 210, respectively. A collar 226 is formed on or secured to shaft 220 at about the midpoint of shaft 220 in the chamber 228 formed by the hollow housing members 208, 210, when the tie rod assembly 200 is in a relaxed condition. The outer diameter 230 of the collar 226 is smaller than the inner diameter 232 of the opening in the annular member 214 to permit collar 226 to reciprocate back and forth therethrough.

Spring seat washers 234 and 236 are slidably mounted on the portion of shaft 220 in the housing portion 208 and retain in a compressed or preloaded condition a spring 238 therebetween, since the seats abut against the bearing 222 and the collar 226. Similarly, coil spring 240 in the housing portion 210 is retained in a preloaded or compressed condition by slidably mounted spring seat washers 242 and 244 on the shaft 220, the seats abutting against the collar 226 and the bearing 224.

Although the inner diameter 232 of annular member 214 is large enough to permit free passage of collar 226, the inner diameter 232 is smaller than the outer diameter of spring seat washers 236 and 242. This permits annular member 214 to function as a stop member during the dwell periods of the transfer mechanism to be described hereinafter.

A portion 246 of the shaft 220 extending from the housing piece 210 is threaded to permit connection of the shaft 220 to internal threads of the connecting assembly 248 on the end 206 of the tie rod 200 which is pivotally connected to the shaft 156.

In operation of the indexing mechanism, the rotation of the index control disc 120 in a clockwise direction moves end 208 of the tie rod assembly 200 pivotally connected to the projection 204 of disc 120 in a circle, causing the other end 206 to move the shaft 156 and the centrally located indexing support member 158 in a reciprocating stroke along index shafts 160.

By offsetting the center of the index control disc 120 to one side of the center line of the travel of the indexing member 158 the rotation of the disc 120 less than one-half of a circle of rotation is sufficient to move the indexing member 158 and the clamp rails 184, 186 the entire transfer distance required between stations. In an experimental model only approximately 110° rotation of the disc 120 was required to index a grasped bottle forward to the next station. Therefore, the percentage portion of a cycle during which the machine 30 can perform actual work operations is increased substantially since less than one-half of a cycle is required to index the bottles forward. Many more machine operations are enabled during a given period of time since the time of a complete cycle can be reduced while still maintaining the same amount of effective work time within a complete cycle.

Another feature of the indexing mechanism permits a dwell period at the end of each stroke forward and at the end of each return stroke back, to enable the bottle clamp opening and bottle clamp closing operations hereinbefore described to occur while the clamp support rails are stationary at the end of each stroke. This is possible because the tie rod assembly 200 is constructed as described with the preloaded springs 238, 240 which permit limited axial movement of the shaft 200 when a force is applied which exceeds the preload force exerted by the springs.

Just before the end 206 of the tie rod assembly 200 approaches the natural finish of an index return or back stroke, a bumper 252 mounted on the index member 158 contacts a stop pin 254 secured to the frame. This stops the index return stroke of the member 158 and the shaft 156.

However, the projection 204 on the disc 120 has not returned to the starting point of the circle of rotation which would initiate a new cycle. Therefore projection 204 continues to move toward the stop pin 254. Since the collar 226 and the shaft 220 cannot move further because of the now fixed position of end 206, the force exerted by spring 238 is overcome by the forces exerted against the spring seats 234, 236. The spring 238 is further compressed and the housing pieces 208, 210 move on the shaft 220 toward the stop pin 256 until the initial starting point of the cycle on the circle of rotation is reached. This position is shown in the cross section of assembly 200 in FIG. 6 where the annular aligning and spacing member 214, which marks the midpoint of chamber 228, is displaced to the right of collar 226 and is serving as a stop member for spring seat 242.

After the projection 204 passes the initial starting point of the cycle, the projection 204 starts to move away from the stop pin 254 and the housing 208, 210 is biased to the left by the force of the compressed spring 238 on the bearing 222 to permit the housing 208, 210 to eventually resume its centrally located position with respect to the collar 226.

When the collar 226 again reaches the midpoint in chamber 228, preloaded spring 240 again contacts the other side of the collar 226 through the spring seat 242. Both springs are preloaded with the same amount of spring force between their respective seats and thus maintain the collar 226 at the midpoint in the chamber 228.

The amount of preloaded spring force exceeds the force exerted by the movement of projection 204 in pulling or pushing the shaft 156 and the indexing member 158 in the reciprocal indexing stroke. Therefore, the tie rod assembly 200 maintains the same overall dimensional length in both the index forward and the index back strokes of the clamp rails, and only changes dimensionally to accommodate the stops at the end of the index strokes, thus creating a dwell period between each index stroke.

The dwell period is similarly created at the end of the index forward stroke. A bumper mounted on an indexing member which is separate from and located to the rear of the central indexing member 158 contacts the stop pin 256 secured to the frame before the rear indexing member reaches the natural end of a forward stroke. (Best seen in FIG. 7).

The tie rod assembly 200 reacts in a similar but opposite fashion to that just described for the index back stroke to create a dwell period at the end of the index forward stroke. Although the indexing member 158 cannot move any further forward because it is mechanically linked to the rear indexing member by an indexing rail means 178, the projection 204 continues to move away from the stop pin 256 until the return portion of the cyclic circle of rotation is reached. This causes the housing 208, 210 to move to the left to further compress the spring 240 between the collar 226 and the spring seat washer 244. When a return portion of the cyclic circle of rotation is reached the projection 204 again starts moving closer to the stop pin 256 and the spring 240 eventually biases collar 226 back to its midpoint location in the chamber 228 so that an index return stroke can begin.

In summary, approximately 110° of rotation of the control disc 120 is utilized for the index forward stroke of the transfer mechanism in taking each bottle to the next station. Approximately 160° of rotation of control disc 120 is utilized in returning the transfer mechanism to its starting point. A total of approximately 90° of rotation of the disc 120 is divided between and used for the two dwell periods at the ends of the index forward and index return strokes. The dwell periods enable the closing of the bottle clamps before the index forward stroke and the opening of the bottle clamps before the index return stroke. The use of a telescoping tie rod assembly which extends and retracts in response to the application of a force larger than that exerted by the preloaded springs contained therein, by contact with stop pins, permits the establishment of dwell periods at the end of each stroke in the indexing sequence for the purposes discussed.

One of the main features of the transfer mechanism is a contractible-extensible tie assembly means which connects the rotary crank driving means to the handling device support means. The tie assembly means includes a first connecting member, a second connecting member, and yielding biasing means linking the first and second connecting members and holding the two connecting members in a predetermined stationary position with respect to each other during the translation of motion from the rotary driving means to the handling device support means between stations. A stop means is positioned to contact the handling device support means before the end of each reciprocal stroke and hold the handling device support means at each station to define an index stroke, while the tie assembly contracts and extends in response to handling device support means contact with the stop means. This creates a dwell period for each station for operation of the handling devices, since the length of the natural reciprocal stroke which would otherwise be imparted by the rotary crank to the handling device support means is greater than the index stroke, which is the distance between stations.

The object handling devices comprise opposed pairs of object grasping means or transfer fingers. Each of the pair of transfer fingers is advanced toward the other during the dwell period at the end of the index back stroke of the transfer mechanism to grasp an object. The transfer fingers are withdrawn from each other during the dwell period at the end of an index forward stroke to release an object. The means for advancing and withdrawing the opposed pairs of object grasping means includes a member having a linear cam surface formed thereon which extends parallel to the line of travel between stations. A lever arm extending from a shaft journally supported in the means for carrying and guiding the handling device support means is responsive to position of the linear cam surface. In response to the completion of each index stroke, the linear cam surface means is shifted between two positions to cause the lever arm to advance and withdraw the opposed pair of object grasping means toward and away from each other.

In conclusion, it is pointed out that while the illustrated examples constitute practical embodiments of my invention, I do not limit myself to the exact details shown since modification of these details may be made without departing from the spirit and scope of this invention.

I claim:

1. Apparatus for transferring articles from station to station comprising
  a. article grasping members,
  b. means for mounting said grasping members for lateral movement between open and closed positions and for reciprocal longitudinal movement, the longitudinal movement in one direction being accomplished while said grasping members are open and longitudinal movement in the other direction being accomplished while said grasping members are closed,
  c. a rotary member interconnected with said mounting means for effecting both lateral and longitudinal movement of said article grasping members,
  d. a contractible-extensible tie assembly means connecting said rotary member to said mounting means for translating the rotary motion of said rotary member to a longitudinal reciprocal stroke motion, the length of said reciprocal stroke being greater than the distance between stations,
  e. said tie assembly means including a first connecting member, a second connecting member, and yielding biasing means linking said first and second connecting members and holding said two connecting members in a predetermined stationary position with respect to each other during the translation of motion from said rotary member to said mounting means between stations,
  f. stop means positioned to contact said mounting means before the end of each reciprocal stroke and hold said mounting means at each station to define an index stroke while said tie assembly contracts and extends in response to said mounting means contact with said stop means, thereby creating a dwell period at each station,
  g. an annular cam rotatable with said rotary member, said cam having first and second arcuate sections of smaller and larger constant radii, respectively, and first and second connecting sections interconnecting said arcuate sections,
  h. a cam follower engaging said cam and mounted on the end of a bell crank to impart reciprocal movement thereto when engaging the connecting sections of the rotating cam and to cause the bell crank to dwell when engaging said constant radii sections, and
  i. means interconnecting said bell crank to said grasping members to cause said grasping members to open when the cam engages the first of said connecting sections and to close when the cam engages the second of said connecting sections.

2. Apparatus as defined in claim 1 in which the center of rotation of said rotary member is offset to one side of the line of travel between stations of said mounting means to cause the longitudinal reciprocal stroke in one direction to be faster than the longitudinal reciprocal stroke in the other direction.

3. Apparatus as defined in claim 1 in which
  a. said first connecting member of said tie assembly comprises a connecting rod shaft, and
  b. said second connecting member of said tie assembly comprises means for slidably supporting said connecting rod shaft for reciprocal motion between said rotary crank driving means and said handling device support means.

4. Apparatus as defined in claim 3 in which said yielding biasing means of said tie assembly comprises spring means mounted to resist relative reciprocal motion between said connecting rod shaft and said means for slidably supporting said rod shaft.

5. Apparatus as defined in claim 4 in which said spring means is pre-loaded to exert a force greater than the force required to move said handling device support means through the index stroke between stations.

* * * * *